US010843122B2

(12) United States Patent
Taylor

(10) Patent No.: US 10,843,122 B2
(45) Date of Patent: Nov. 24, 2020

(54) SYSTEMS AND METHODS FOR REMOVING HYDROGEN SULFIDE FROM AN AMMONIA STREAM

(71) Applicant: Bechtel Hydrocarbon Technology Solutions, Inc., Houston, TX (US)

(72) Inventor: Martin Taylor, Houston, TX (US)

(73) Assignee: BECHTEL HYDROCARBON TECHNOLOGY SOLUTIONS, INC., Houston, TX (US)

( * ) Notice: Subject to any disclaimer, the term of this patent is extended or adjusted under 35 U.S.C. 154(b) by 0 days.

(21) Appl. No.: 16/586,076

(22) Filed: Sep. 27, 2019

(65) Prior Publication Data

US 2020/0023303 A1 Jan. 23, 2020

Related U.S. Application Data

(63) Continuation of application No. 16/386,515, filed on Apr. 17, 2019, now Pat. No. 10,456,735, which is a continuation of application No. 15/522,884, filed as application No. PCT/US2015/059560 on Nov. 6, 2015, now Pat. No. 10,315,153.

(60) Provisional application No. 62/076,678, filed on Nov. 7, 2014.

(51) Int. Cl.

| | |
|---|---|
| ***B01D 53/02*** | (2006.01) |
| ***B01D 53/14*** | (2006.01) |
| ***B01D 53/52*** | (2006.01) |
| ***B01D 53/78*** | (2006.01) |
| ***C01B 17/16*** | (2006.01) |
| ***C01C 1/02*** | (2006.01) |

(52) U.S. Cl.

CPC ......... *B01D 53/1468* (2013.01); *B01D 53/02* (2013.01); *B01D 53/52* (2013.01); *B01D 53/78* (2013.01); *C01B 17/167* (2013.01); *C01C 1/024* (2013.01); *B01D 2257/304* (2013.01)

(58) Field of Classification Search

CPC .............. B01D 2257/304; B01D 53/02; B01D 53/1468; B01D 53/52; B01D 53/78; C01B 17/167; C01C 1/024

See application file for complete search history.

(56) References Cited

U.S. PATENT DOCUMENTS 3,383,173 A * 5/1968 Bollen ...................... C01C 1/12 423/234
3,864,449 A * 2/1975 Homberg ........... B01D 53/1493 423/228
5,024,682 A 6/1991 Turk

FOREIGN PATENT DOCUMENTS

CN 103958398 A 7/2014

OTHER PUBLICATIONS

Dr. Sunita Rani, Examination Report, Application No. 201717015490, dated Oct. 11, 2019, 5 pages, Intellectual Property India, New Delhi, India.

Tarun Khurana, Response to Exam Report, Application No. 201717015490, dated Nov. 15, 2019, 110 pages, Khurana & Khurana, Advocates and IP Attorneys, India.

* cited by examiner

*Primary Examiner* — Cabrena Holecek
(74) *Attorney, Agent, or Firm* — Crain, Caton and James

(57) ABSTRACT

Systems and methods for removing hydrogen sulfide from an ammonia stream in the NH3 purification and liquefaction stage of a conventional two-column sour water stripping system using an adsorbent bed.

1 Claim, 3 Drawing Sheets

200
Ammonia Vapor 140
202
160
Ammonia Vapor to Incineration
Water 142
Caustic 144
162
Cooling Water
146
148
Anhydrous Liquid Ammonia 170
Anhydrous Liquid Ammonia 170
149
Water
Aqueous Ammonia 180

SYSTEMS AND METHODS FOR REMOVING HYDROGEN SULFIDE FROM AN AMMONIA STREAM

CROSS-REFERENCE TO RELATED APPLICATIONS

This application is a continuation of U.S. patent application Ser. No. 16/386,515, filed on Apr. 17, 2019, which is a continuation of U.S. patent application Ser. No. 15/522,884, filed on Apr. 28, 2017, which is a U.S. National Stage Application of PCT Patent Application No. PCT/US15/59560, filed on Nov. 6, 2015, which claims the priority of U.S. Provisional Patent Application No. 62/076,678, filed Nov. 7, 2014, which are each incorporated herein by reference. This application and PCT Patent Application Serial No. PCT/US2015/019015, which is also incorporated herein by reference, are commonly assigned to Bechtel Hydrocarbon Technology Solutions, Inc.

STATEMENT REGARDING FEDERALLY SPONSORED RESEARCH

Not applicable.

FIELD OF THE INVENTION

The present invention generally relates to systems and methods for removing hydrogen sulfide from an ammonia stream. More particularly, the present invention relates to removing hydrogen sulfide from an ammonia stream using an adsorbent bed.

BACKGROUND OF THE INVENTION

Conventional technology separately recovers hydrogen sulfide (H2S) and ammonia (NH3) from sour water using an H2S stripper and an NH3 stripper, which is sometimes referred to as a two-column sour water stripping process. This process yields acid gas (H2S) with less than 50 ppmw NH3 and a high purity gaseous or liquid NH3 product. The separated water is of excellent quality, making it suitable for reuse as coke drum quench water, crude unit desalter water, and hydro-processing unit injection water or it may be sent to effluent treating for discharge.

A two-column sour water stripping process typically includes four main processing stages: 1) degassing and feed preparation; 2) H2S stripping; 3) NH3 stripping; and 4) NH3 purification and liquefaction. Referring now to FIGS. 1A and 1B, a schematic diagram of a conventional two-column sour water stripping system illustrates the four processing stages. The following pressures and temperatures are exemplary and only for purposes of illustration.

Degassing and Feed Preparation:

Sour water feeds 102 from a single or several sources are combined with a recycle stream 104 from the NH3 stripper 106, which are cooled and passed through a degasser 108 where dissolved hydrogen (H2), methane (CH4) and other light hydrocarbons are removed as a hydrocarbon vapor stream 105. The sour water feeds 102 include dissolved NH3 and H2S. The recycle stream 104 includes rich NH3, which helps keep acid gases in solution in the degasser 108, thereby minimizing the release of acid gas and possible air pollution. The degassed sour water stream 109 is sent to a deoiler 103, which removes free oil from the degassed sour water stream 109 to produce a degassed/deoiled sour water stream 107. The degassed/deoiled sour water stream 107 is pumped to a feed preparation tank 110, which serves to attenuate flow rate and composition changes while also providing the opportunity to remove entrained oil and solids. The feed preparation tank 110 produces a processed sour water stream 111, which is pumped to a feed coalescer unit 112 that filters solids remaining in the processed sour water stream 111 and further separates entrained oil to produce a hydrocarbon liquid 113 and a deoiled sour water stream 115. The deoiled sour water stream 115 is sent to a feed/product exchanger 114, which acts as a heat exchanger to heat the deoiled sour water stream 115 and cool the NH3 stripper bottoms stream 132 to produce a heated deoiled sour water stream 116 and the stripped water stream 134. In this manner, the components comprising the NH3 stripper bottoms stream 132, stripped water stream 134 and the components comprising the deoiled sour water stream 115, heated deoiled sour water stream 116 are, respectively, the same but may have different concentrations and temperatures. The heated deoiled sour water stream 116 is then sent to an H2S stripper 118.

H2S Stripping:

The H2S stripper 118 contains trays or packing (not shown) that the heated deoiled sour water stream 116 flows through and around to separate H2S from the heated deoiled sour water stream 116. A cooled reflux water stream (e.g. water wash) 136 is used remove heat and suppress evolution of gaseous NH3 in the H2S stripper. A reboiler 137 acts as a heat exchanger to provide the energy required to i) heat the heated deoiled sour water stream 116 and the cooled reflux water stream 136 to a preferred temperature; and ii) strip out H2S from the heated deoiled sour water stream 116. The resulting H2S stripper overheads stream 120 is sent to a knock out drum 138 to substantially remove any entrained droplets and produce H2S stream 126. The H2S stream 126 is of high purity and is an excellent feed for a sulfur recovery unit (SRU) or a sulfuric acid plant. It contains a negligible amount of NH3 (less than 50 ppmw) and very little hydrocarbons since the sour water feeds 102 have been degassed. The H2S stream 126 is available at about 100-180 psig and 100-120° F. The resulting H2S stripper bottoms stream 130, which contains NH3 and some H2S, is sent directly to the NH3 stripper 106.

NH3 Stripping:

The NH3 stripper 106 is a steam re-boiled, refluxed distillation column. In the NH3 stripper 106, essentially all NH3 and any remaining H2S are removed from the H2S stripper bottoms stream 130, which leaves the NH3 stripper 106 as an NH3 stripper bottoms stream 132. The NH3 stripper bottoms stream 132 is sent to the feed/product exchanger 114 where heat is exchanged with the deoiled sour water stream 115 and the NH3 stripper bottoms stream 132 is cooled to form the stripped water stream 134. The stripped water stream 134 is suitable for many plant reuse needs or may be discharged. The containment levels of H2S and NH3 in the stripped water stream 134 may be tailored to individual requirements and is typically 10-50 ppmw NH3 and 1-25 ppmw H2S. The stripped water stream 134 is available at about 100-200° F. In the NH3 stripper 106, essentially all NH3 and any remaining H2S are removed from the H2S stripper bottoms stream 130, which leaves the NH3 stripper 106 as an NH3 stripper overheads stream 133. The NH3 stripper overheads stream 133 is sent to an overhead condenser where it is converted to an NH3 vapor stream and an NH3 liquid stream. A knock out drum 139 separates the NH3 vapor stream 140 and the NH3 liquid stream 150. A portion of the NH3 liquid stream 150 is returned as reflux to the NH3 stripper 106 and another portion of the NH3 liquid stream 150 forms the recycle stream 104. A reboiler 141 acts as a heat exchanger to provide the energy required to remove NH3 and any remaining H2S. The NH3 vapor stream 140 is an NH3-rich gas, which may be processed in a variety of ways.

NH3 Purification and Liquefaction:

Referring now to FIG. 1B, the NH3 vapor stream 140 is sent to a water wash 142 to remove residual amounts of H2S and some hydrocarbons. This step is also referred to as water scrubbing, which produces a scrubbed NH3 vapor stream 160. If NH3 recovery is not desired or economic, the scrubbed NH3 vapor stream 160 may be incinerated. In most cases, however, it is desirable to further purify the scrubbed NH3 vapor stream 160 to produce either an anhydrous liquid NH3 stream 170 or an aqueous NH3 stream 180 suitable for commercial use. In order to further purify the scrubbed NH3 vapor stream 160, the scrubbed NH3 vapor stream 160 is sent to a caustic wash 144 to remove residual contaminants including some hydrocarbons. This step is also referred to as caustic scrubbing, which produces a double scrubbed NH3 vapor stream 162 and may be necessary when problems are expected with process upsets, carbon dioxide, or complex sulfur compounds (e.g. mercaptans or disulfides). The double scrubbed NH3 vapor stream 162 may be sent to either a compressor 146 or a refrigeration unit 148 to produce the anhydrous liquid NH3 stream 170, which contains a negligible amount of H2S (less than 5 ppmw). The anhydrous liquid NH3 stream 170 is available at about 200 psig and 100° F. if liquefied by compression and at atmospheric pressure and about −26 F if liquefied by cooling. Cooling water and/or a refrigerant may be used to exchange heat with the double scrubbed NH3 vapor stream 162. The double scrubbed NH3 vapor stream 162 may also be sent to an NH3 absorber 149, which is essentially another water wash, to produce the aqueous NH3 stream 180, which contains a negligible amount of sulfur (no more than about 2 ppmw). The aqueous NH3 stream 180 is available at about 35 psig and 100° F.

SUMMARY OF THE INVENTION

The present invention overcomes one or more of the prior art disadvantages by providing systems and methods for removing hydrogen sulfide from an ammonia stream using an adsorbent bed.

In one embodiment, the present invention includes a system for removing hydrogen sulfide from an ammonia stream, which comprises: i) an ammonia vapor stream; ii) a water wash connected to the ammonia vapor stream for removing hydrogen sulfide from the ammonia vapor stream and producing a scrubbed ammonia vapor stream; iii) a caustic wash connected to the scrubbed ammonia vapor stream for removing residual contaminants in the scrubbed ammonia vapor stream and producing a double scrubbed ammonia vapor stream; iv) at least one of a compressor and an ammonia absorber connected upstream to only the double scrubbed ammonia vapor stream for producing at least one of an anhydrous liquid ammonia stream and an aqueous ammonia stream; and v) wherein the ammonia vapor stream, the scrubbed ammonia vapor stream, the double scrubbed ammonia vapor stream, the anhydrous liquid ammonia stream and the aqueous ammonia stream are each connected to a respective contacting vessel with a liquid scavenger or adsorbent bed for removing hydrogen sulfide from the respective stream, each contacting vessel including a liquid scavenger selected from the group consisting of monoethanolamine, triazine, triazine based chemical mixtures, caustic, polyhydric alcohols, and amine resin solutions, and each adsorbent bed including an adsorbent selected from the group consisting of zinc oxide, activated carbon, molecular sieves, iron oxides, or a combination or iron oxides, silica, water, and Montmorillonite.

Additional aspects, advantages and embodiments of the invention will become apparent to those skilled in the art from the following description of the various embodiments and related drawings.

BRIEF DESCRIPTION OF THE DRAWINGS

The present invention is described below with references to the accompanying drawings in which like elements are referenced with like numerals and in which.

DETAILED DESCRIPTION OF THE PREFERRED EMBODIMENTS

The subject matter of the present invention is described with specificity, however, the description itself is not intended to limit the scope of the invention. The subject matter thus, might also be embodied in other ways, to include different steps or combinations of steps similar to the ones described herein, in conjunction with other technologies. Moreover, although the term "step" may be used herein to describe different elements of methods employed, the term should not be interpreted as implying any particular order among or between various steps herein disclosed unless otherwise expressly limited by the description to a particular order. While the following description refers to the oil and gas industry, the systems and methods of the present invention are not limited thereto and may also be applied in other industries, such as the gasification industry, to achieve similar results.

The present invention provides systems and methods to remove hydrogen sulfide from an ammonia stream using an adsorbent bed. The purpose of the adsorbent bed is to enhance the removal of hydrogen sulfide from the ammonia stream during the NH3 purification and liquefaction processing stage.

Figure 1A:
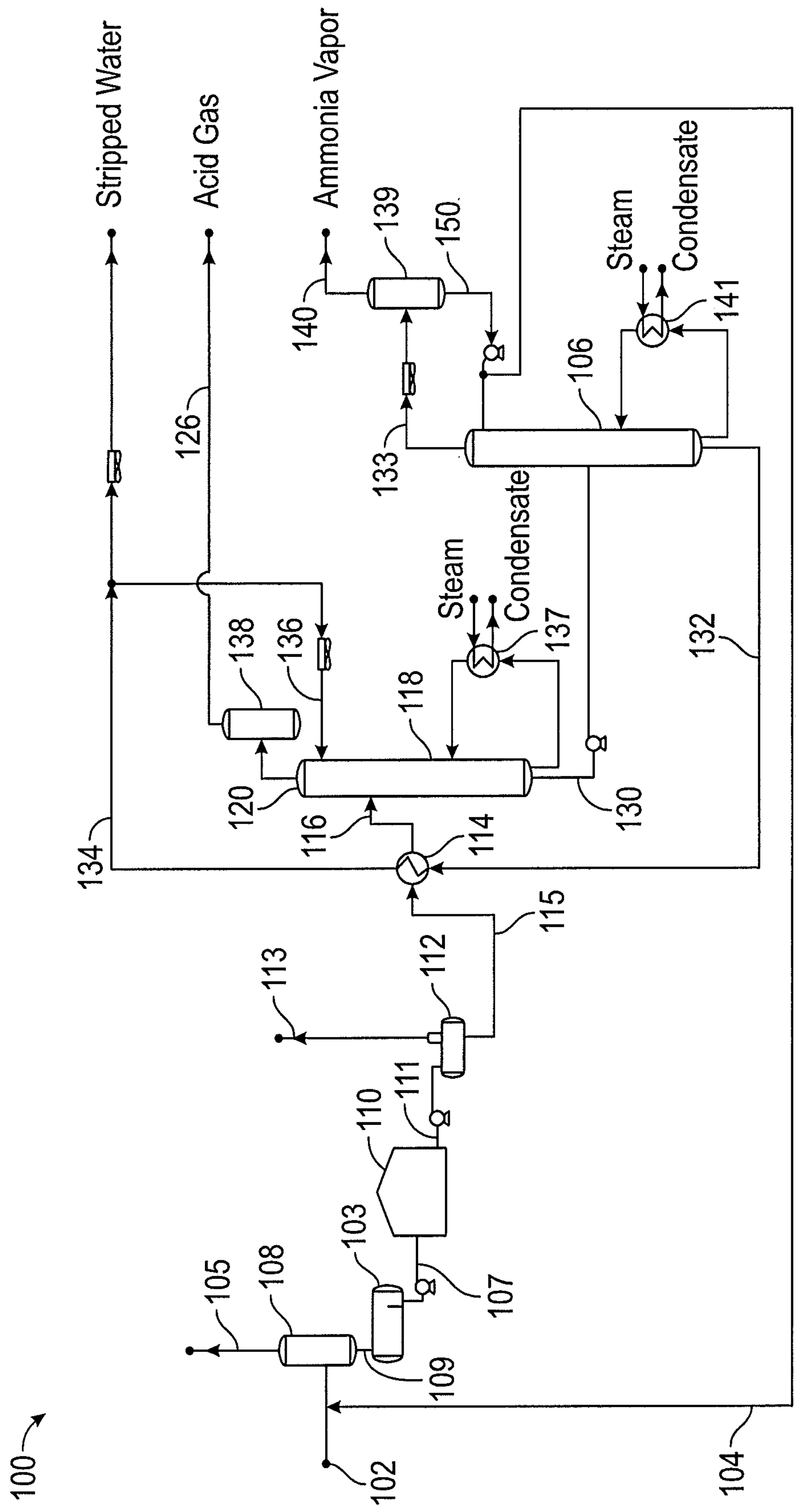
FIGS. 1A-1B are schematic diagrams illustrating a conventional two-column sour water stripping system.
Figure 1B:
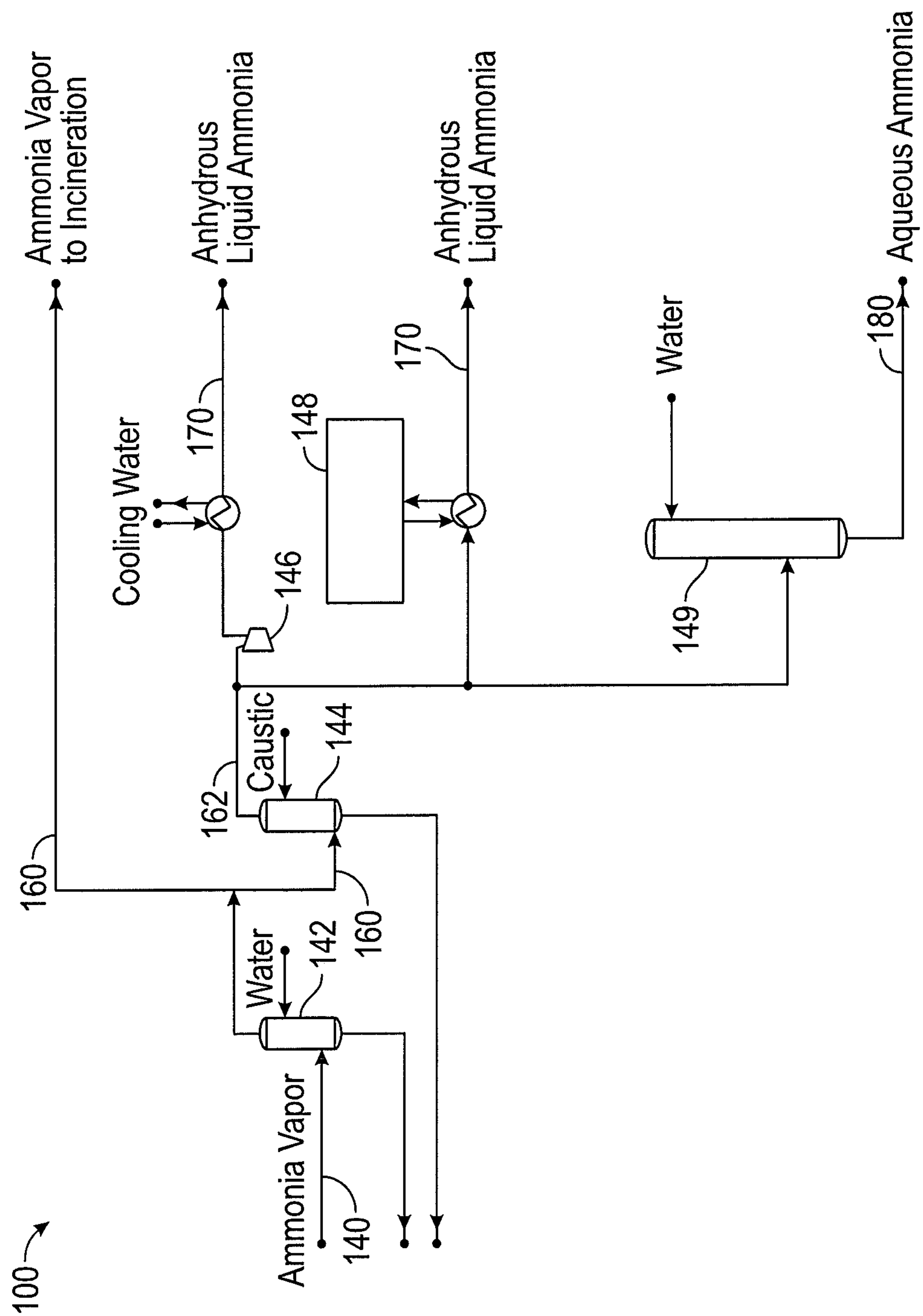
Figure 2:
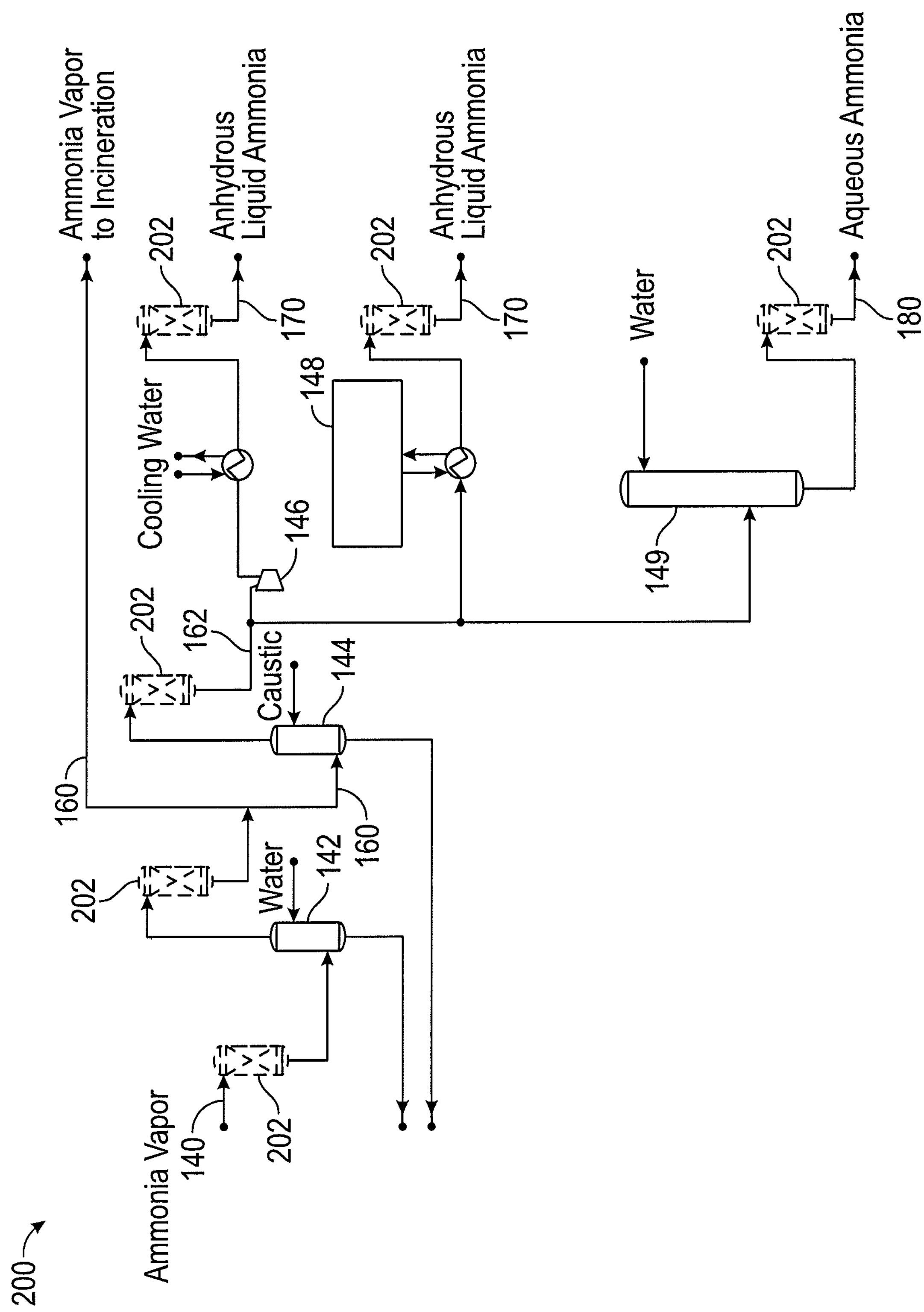
FIG. 2 is a schematic diagram illustrating the NH3 purification and liquefaction stage in FIG. 1B according to the present invention.

Referring now to FIG. 2, a schematic diagram of the NH3 purification and liquefaction stage in FIG. 1B illustrates the use of an adsorbent bed to remove hydrogen sulfide from the ammonia stream. This stage can consist of various pieces of equipment depending upon the ultimate concentration and quality of NH3 desired. The adsorbent bed 202 may be positioned in one or more of the locations illustrated in FIG. 2. Preferably, however, a single adsorbent bed 202 is positioned at a location that will be the final processing step for processing the scrubbed NH3 vapor stream 160, the anhydrous liquid NH3 stream 170 or the aqueous NH3 stream 180. In other words, the adsorbent bed 202 may be positioned at a location i) before the water wash 142 to process the ammonia vapor stream, ii) after the water wash 142 to process the scrubbed NH3 vapor stream 160; iii) after the compressor 146 or the refrigeration unit 148 to process the anhydrous liquid NH3 stream 170; or iv) after the NH3 absorber 149 to process the aqueous NH3 stream 180. In the event that the NH3 purification and liquefaction stage includes the production of the scrubbed NH3 vapor stream 160, the anhydrous liquid NH3 stream 170 and the aqueous NH3 stream 180, then, optionally, the adsorbent bed 202 may be positioned at a location between the caustic wash 144 and each of the compressor 146, the refrigeration unit 148 and the NH3 absorber 149. In this manner, any conventional two-column sour water stripping system that includes an NH3 purification and liquefaction stage may be easily retrofitted with one or more adsorbent beds. Various combinations of adsorbent beds and their locations in the NH3 purification and liquefaction stage will be apparent to those skilled in the art.

The adsorbent may include any commercial sulfur adsorbent. The adsorbent may suitably be formed into granules, powders, extrudates, pellets or other shapes to permit the passage of process fluids over (e.g. around and through) the adsorbent. For this purpose, the active component of the adsorbent may consist of high internal surface area materials such as, for example, zinc oxide, activated carbon, molecular sieves, iron oxides, or combination of iron oxides, silica, water, and Montmorillonite. The components of the adsorbent may be either naturally occurring or in the form of gelatinous precipitates or gels including mixtures of silica. The relative proportions of active material and matrix vary widely, with the active material content ranging from about 1 up to 100 percent by weight. The adsorbents may or may not be regenerable.

Alternatively, a liquid scavenger such as, for example, monoethanolamine, triazine, triazine-based chemical mixtures, caustic, polyhydric alcohols, and amine resin solutions, may be used in the same manner and in the same positions as the adsorbent bed described in reference to FIG. 2. In this embodiment, a contacting vessel may be used to replace the adsorbent bed and introduce the liquid scavenger. Optionally, a filter or coalescer may be positioned downstream from each contacting vessel to remove any entrained scavenger liquid from the ammonia stream.

In the operation of any conventional two-column sour water stripping system with an NH3 purification and liquefaction stage that includes one or more adsorbent beds or contacting vessels with a liquid scavenger, the quality of the anhydrous liquid NH3 recovered may be improved up to Haber quality NH3 (i.e. industry standard for anhydrous liquid NH3). Anhydrous liquid NH3 recovered from a conventional two-column sour water stripping system is frequently sold at a discount to Haber quality NH3 and blended with Haber quality NH3. It is expected that the present invention should enable the production of anhydrous liquid NH3 with significantly less than 5 ppmw hydrogen sulfide that can be sold at the same price as Haber quality NH3-without the additional expense of having to blend the conventionally produced anhydrous liquid NH3 with Haber quality NH3.

Conventional two-column sour water stripping systems have been around since the 1960's. Anhydrous liquid NH3 produced by such systems is frequently blended with Haber quality NH3. While operators of such systems have recognized the need for producing anhydrous liquid NH3 that meets the standard of Haber quality NH3, they often simply pass on the blending costs to the purchaser of the final product. And the purchasers in the NH3 industry are accustomed to the fluctuations in price that accompany the commodities markets. This explains why the need for producing less costly Haber quality NH3, using one or more adsorbent beds or contacting vessels with a liquid scavenger in the NH3 purification and liquefaction stage of a conventional two-column sour water stripping system, has been unresolved since the 1960's.

The invention claimed is:

1. A system for removing hydrogen sulfide from an ammonia stream, which comprises:

an ammonia vapor stream;

a water wash connected to the ammonia vapor stream for removing hydrogen sulfide from the ammonia vapor stream and producing a scrubbed ammonia vapor stream;

a caustic wash connected to the scrubbed ammonia vapor stream for removing residual contaminants in the scrubbed ammonia vapor stream and producing a double scrubbed ammonia vapor stream;

at least one of a compressor and an ammonia absorber connected upstream to only the double scrubbed ammonia vapor stream for producing at least one of an anhydrous liquid ammonia stream and an aqueous ammonia stream; and wherein the ammonia vapor stream, the scrubbed ammonia vapor stream, the double scrubbed ammonia vapor stream, the anhydrous liquid ammonia stream and the aqueous ammonia stream are each connected to a respective contacting vessel with a liquid scavenger or adsorbent bed for removing hydrogen sulfide from the respective stream, each contacting vessel including a liquid scavenger selected from the group consisting of monoethanolamine, triazine, triazine based chemical mixtures, caustic, polyhydric alcohols, and amine resin solutions, and each adsorbent bed including an adsorbent selected from the group consisting of zinc oxide, activated carbon, molecular sieves, iron oxides, or a combination of iron oxides, silica, water, and Montmorillonite.

* * * * *